United States Patent Office 3,284,159
Patented Nov. 8, 1966

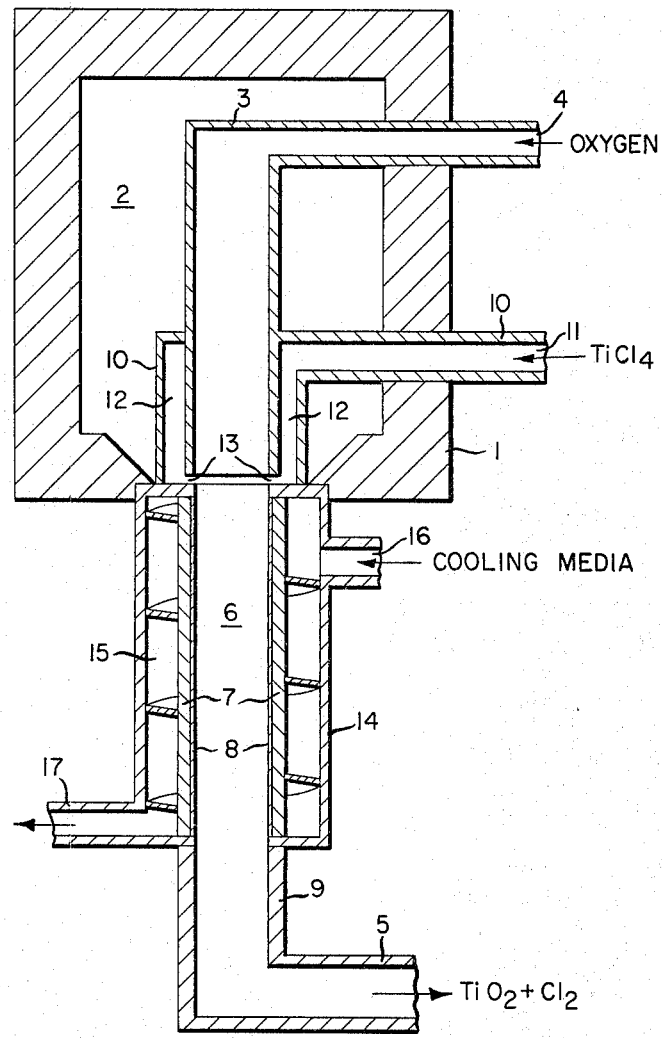

3,284,159
PIGMENTARY TiO₂ MANUFACTURE
Willard Emil Kruse, Dickson, Tenn., assignor to E. I. du Pont de Nemours and Company, Wilmington, Del., a corporation of Delaware
Filed Jan. 3, 1964, Ser. No. 335,548
4 Claims. (Cl. 23—202)

This invention relates to a method for preparing titanium dioxide. More particularly, the invention is directed to a process for preparing titanium dioxide by oxidizing at elevated temperatures a metal halide to produce a metal oxide in a metallic reaction zone without substantial corrosion of the metallic reaction zone surface or contamination of the titanium dioxide pigment.

Briefly, processes for preparing titanium dioxide involve volatilizing a metal halide, for example, titanium tetrachloride or the like and mixing the metal halide in a reaction zone in the vapor state with oxygen or an oxygen-containing gas, for example air, thereby producing the respective oxide of the metal and chlorine. The reaction may be represented by the following equation:

$$TiCl_4 + O_2 \rightarrow TiO_2 + 2Cl_2$$

The reaction illustrated above appears to be relatively simple and straightforward. However, in the industrial operation of this process problems arise that affect the successful commercial manufacture of titanium dioxide. Major operating difficulties primarily involved in these processes are (1) corrosion of reactor components, particularly the reaction zone wall, (2) contamination of the titanium dioxide particles by the corrosion products formed due to deterioration of the reaction zone wall and, (3) build-up and infiltration into the pigment of titanium dioxide wall scale that is formed on the reaction zone wall during the process. Therefore, prior to this invention in the manufacture of titanium dioxide at high temperatures the wall defining the reaction zone, i.e., the reaction zone wall, was usually constructed of ceramic material, e.g., silica, firebrick, alumina or the like because when metal was used contamination of pigmentary titanium dioxide by metallic corrosion products resulted. The utilization of ceramic or refractory material did overcome the serious problem of contaminating titanium dioxide by metal corrosion products; however, it also created additional problems of contamination of titanium dioxide due to cracking of the ceramic material under process conditions and wall scale build-up. The use of firebrick as the reaction zone wall leaves much to be desired because the firebrick wall will crack over a period of time and consequently contaminate the titanium dioxide pigment. Furthermore, the use of silica as the reaction zone wall for a commercial operation is expensive because the fragile nature of the material results in frequent breakage which requires replacement. Additional solutions to the above enumerated operational problems also include using a porous reaction zone wall of ceramic material or graphite and maintaining a shielding gas over the surface of the wall during oxidation. The problem of contamination of titanium dioxide pigment with wall scale and also plugging of the reaction zone due to wall scale build-up is eliminated when the process is conducted in a reaction zone wherein an inert gas is diffused through the porous wall, as described in U.S. Patents 2,670,272 and 2,915,367. However, the fragile nature of the porous material under the operating conditions of the process requires replacement of this rather expensive material at a substantial cost.

The most desirable commercial system for producing titanium dioxide is to carry out the oxidation process in a reaction zone wherein the wall is fabricated from metals, for example nickel, steel or the like because of the advantages attending them such as strength, thermal shock resistance, higher thermal conductivity and ease of fabrication. However, prior to this invention, when the reaction zone wall was fabricated from a nonporous or imperforated metal, within a very short time, even the most stable alloys would burn up and erode which resulted in not only shortening the usefulness of the apparatus but also contaminating the titanium dioxide pigment with the corresponding metal oxide corrosion products, e.g., nickel oxide, iron oxide etc., from which the reaction zone wall was constructed. The metal corrosion products, as would be expected, adversely affected the color of the pigment.

An object of this invention is to provide a process for preparing titanium dioxide pigment in a reaction zone wherein the wall defining said zone is fabricated from solid, imperforated metal and obtain titanium dioxide substantially free of metallic corrosion products. Another object of the invention is to provide a process for preparing titanium dioxide pigment wherein the reaction zone wall is fabricated from imperforated metal and substantially no build-up and consequent flaking off of titanium dioxide wall scale occurs during oxidation that results in contamination of the titanium dioxide. A further object of the invention is to provide a process for producing titanium dioxide wherein plugging of the reaction zone due to wall scale build-up does not occur. Another object of this invention is to provide an economical and efficient process for preparing titanium dioxide that provides prolonged operation of the oxidation process without pluggage of the reaction zone or corrosion of the imperforated reaction zone wall which, heretofore, was characteristic of titanium tetrachloride oxidation processes. These and other objects and advantages of the invention will be obvious from the following description and accompanying diagrammatic drawing showing a vertical, sectional view of one appropriate form of apparatus for practicing the process of this invention.

According to the process of this invention, the reaction of a metal halide with oxygen, or an oxygen-containing gas, to produce the corresponding metal oxide can be carried out in an apparatus wherein the wall defining the reaction zone, i.e., the reaction zone wall, is constructed of metal and, moreover, without substantial corrosion of the metallic imperforated reaction zone wall or substantial formation of titanium dioxide wall scale thereon that would result both in contaminating the titanium dioxide pigment and plugging the apparatus requiring shut-down for removal of the accumulated wall scale. It has now been discovered that if the internal surface of the metallic imperforated reaction zone wall is first coated with a thin layer of a white thermoreflective inorganic oxide to form a glazed surface thereon, the subsequent flame reaction of a metal halide with oxygen in the vapor phase in the oxidation reaction zone produces substantially pure titanium dioxide. The reaction zone wall is substantially free from corrosion after extensive use and, therefore, the titanium dioxide pigment does not contain metallic corrosion products. Titanium dioxide wall scale that heretofore was consistently associated with vapor phase titanium dioxide processes conducted in oxidation reaction zones fabricated of metal is substantially eliminated. It has further been found that additional advantages result from the process when the metallic oxidation reaction zone wall is cooled to about 450–500° C., or below, during the oxidation reaction. The lower temperature limit to which the metal wall can be cooled is not critical; however, it is difficult to reduce the temperature of the metal wall much below 300° C. or 250° C. Of course, the reaction zone wall is never cooled to a temperature below the boiling point or the sublimation temperature of the metal halide being reacted, e.g., about 136° C. for titanium tetrachloride. Prior to this invention it had not been practical to use apparatus fabricated from metal in the oxidation reaction zone because the oxidation of the metal halide, e.g., titanium tetrachloride, at the high temperature and concentrations used, would within a very short time, disintegrate and erode the metal. As pointed out above, the disintegration of the metal had the dual effect of contaminating the product, titanium dioxide, with metallic oxide corrosion products and, of course, corrosion required replacement of process equipment.

In a specific or preferred embodiment the invention comprises coating the internal surface of the metallic imperforated oxidation reaction zone wall with a thin layer of titanium dioxide. This can be accomplished by applying an aqueous slurry of titanium dioxide by means of a brush or spray gun to the reaction zone wall. The resulting coating of titanium dioxide is permitted to dry at room or ambient temperature or it may be gradually heated to expedite drying. When the titanium dioxide layer is dry it forms a glazed surface on the metal reaction zone wall. After the metal wall has been coated, then streams of titanium tetrachloride and oxygen are mixed and conducted into the reaction zone wherein they are reacted at a flame temperature of from about 600° to 1600° C. while the metal reaction zone wall is cooled during oxidation, to about 450° C. Substantially no corrosion of the metal reaction zone wall is detected and no metal oxide corrosion products contaminate the pigmentary titanium dioxide. Titanium dioxide wall scale buildup in the reaction zone is negligible and, therefore, a high-grade pigmentary titanium dioxide is produced.

Referring to the drawing, there is shown a vertically arranged furnace 1 which may be wholly or partially insulated as desired and can be maintained at any required temperature by means of electrical or other heating means (not shown). A heating chamber 2 is provided in the furnace 1 to which a suitably disposed conduit 3 composed of corrosion-resistant metal or other suitable material capable of withstanding relatively high temperature and the corrosive action of reactants to which it may be subjected during use. The conduit 3 is provided with an inlet 4 through which oxygen or an oxygen-containing gas such as air can be separately fed at any desired rate from a source of supply (not shown). An outlet 5 is provided in the lower portion of the apparatus through which reaction products can be withdrawn from the apparatus for separation, treatment and recovery in suitable associated equipment (not shown). Positioned below conduit 3 is reaction zone 6 having an enveloping reaction zone wall 7 which is, as shown, forms a substantial continuation of wall element 9 and defines the reaction zone. The reaction zone wall 7, defining reaction zone 6, is composed of a rigid, imperforated corrosion-resistant metallic material, for example, nickel, or a suitable alloy thereof. The metal reaction zone wall 7 is provided with a coating of a white thermoreflective inorganic oxide 8 that forms a glazed surface thereon, for example, titanium dioxide, silica, aluminum oxide and the like.

Suitably arranged above the reaction zone wall 7 and disposed in spaced relationship about conduit 3 is associated tubular conduit 10 which also is preferably constructed of corrosion-resistant material. Conduit 10 is provided with an inlet 11 communicating with channel 12 and terminates as an annular discharge or circumferential slot jet outlet 13. Inlet 11 communicates with a suitable source of metal chloride supply (not shown) and passage 12 and outlet 13 of conduit 10 are in open communication with the interior of cylindrical conduit 3 and reaction zone 6. Concentrically disposed in spaced and enclosing gas-tight relationship about the reaction zone wall 7 is a jacket 14, also composed of corrosion-resistant material, the arrangement being adapted to form a passage 15 with cooling fluid inlet 16 through which a suitable cooling fluid from a source of supply (not shown) can be introduced into passage 15 for maintenance therein of reaction zone wall 7 at a desired temperature at or below about 500° C. The cooling fluid is removed through cooling fluid outlet 17.

One adaptation of the invention in an apparatus such as described above to produce pigmentary titanium dioxide according to a preferred application in which the oxidation procedure disclosed in U. S. Patent 2,488,439 is utilized will be described. In that patent, titanium tetrachloride is decomposed at temperatures ranging from about 800° C. and preferably in excess of 1000° C. and up to 1350° C. or 1450° C. by reacting it with an oxidizing gas such as oxygen, air, oxygen-enriched air or mixtures thereof, and in the presence of regulated amounts of from .05 to 10% and preferably from 0.1% to 5% based on the total volume of gases of water vapor. However, in the present invention the internal surface of the metallic imperforated reaction zone wall 7 must first be coated with a protective layer of titanium dioxide prior to the oxidation reaction. The coating is applied by painting an aqueous slurry of titanium dioxide onto the surface of the metal reaction zone wall before it is placed in operation. The slurry can be made by adding titanium dioxide, either raw titanium dioxide as it comes from the reactor and contains possibly some unreacted titanium tetrachloride, or by taking purified titanium dioxide pigment and diluting it with water until a slurry is formed that has a paintable consistency; for example, usually about a 30% titanium dioxide concentration in the slurry produces satisfactory results. This slurry, having a paint-like consistency, is then brushed on the internal surface of the reaction zone wall so that when the wall is dry it will have a coating of titanium dioxide at least 0.01 inch or greater in thickness. Then, titanium tetrachloride and the oxidizing gas, in proper velocity ratio, are separately and continuously fed to the reactor, the preheated oxidizing gas is fed through inlet 4 into conduit 3 into reaction zone 6 that is defined by reaction zone wall 7 to which has been applied a coating of a white thermoreflective inorganic oxide 8 preferably titanium dioxide, thereby preventing corrosion of the metalic reaction zone wall 7. Titanium tetrachloride in the form of a thin sheet or stream is passed into the oxidizing gas through circumferential slot outlet 13 forming an outlet for channel 12 through which the titanium tetrachloride flows from inlet 11. The reaction zone wall 7 is cooled to about 500° C. or below during the reaction of the oxidizing gas and titanium tetrachloride by circulating a cooling fluid, for example, water through fluid inlet 16 into the confining passage 15 of the jacket 14 surrounding the reaction wall 7 and flowing through fluid outlet 17. The cooling fluid is constantly charged into said passage from a source of supply (not shown) through fluid inlet 16. By maintaining the reaction zone wall at a temperature of about 450–500° C. the formation of titanium dioxide scale that would form thereon is further reduced. The resulting reaction products, containing titanium dioxide, are withdrawn from the reactor by means of outlet 5, are subjected to quick cooling or quenching to a temperature below 600° C. to prevent undesired titanium dioxide particle size growth, and the titanium dioxide product is separated and recovered therefrom. It is then subjected to any desired finishing treatment to obtain the desired high quality pigment grade titanium dioxide product.

By forming a thin coating of a white thermoreflective inorganic oxide such as titanium dioxide on the surface of the metallic imperforated reaction zone wall, the serious and detrimental corrosion problem that is associated with oxidation reactions of titanium tetrachloride carried out in a metallic reactor is eliminated. In addition, the combination of a white thermoreflective inorganic oxide coating on the reaction zone wall and the step of cooling said walls to about 450–500° C., effectively overcomes objectionable oxide scale formation and consequent plugging of the apparatus due to wall scale buildup, as well as pigment degradation encountered due to flaking off of the oxide scale which contaminates the pigmentary titanium dioxide.

For a clearer understanding of the invention the following specific examples are given. These examples are illustrative only and are not to be construed as limiting the underlying principles and scope of the invention.

Example 1

A reactor having the general construction shown in the drawing was provided with a nickel imperforated reaction zone wall indicated at 7 and having a titanium dioxide coating 8 applied thereto. The nickel wall has an internal diameter of 12 inches and a length of 35 inches and the titanium dioxide coating on the interior diameter of the reaction zone wall has an average thickness of about 0.01 inch. The titanium dioxide coating was applied to the reaction zone wall by painting thereon a slurry of 25% $TiO_2$ by weight in water, which had previously been adjusted to a pH of 3.5 with hydrochloric acid. The titanium dioxide coating was permitted to dry and gradually preheated to about 300° C. by passing hot air through the chamber in contemplation of the oxidation reaction. The nickel reaction zone wall was about ¼ inch thick prior to coating it with a layer of titanium dioxide having a thickness of about 0.01 inch. The reaction zone was enclosed within a tubular jacket 14 constructed of nickel and having an internal diameter of 14½ inches. Water was introduced into the jacket at inlet 16 at internal surface velocities of 4–5 feet per second. The inlet temperature of the water was from about 8 to 30° C. thereby cooling the reaction zone wall during the oxidation reaction to a temperature no higher than about 500° C. Titanium tetrachloride, containing 1.2 to 1.8 parts by weight of aluminum trichloride, was preheated to 300–400° C. and added to the reactor at a rate of 125 pound moles per hour. Oxygen was preheated at 1575° to 1600° C. and was added to the reactor in the form of a stream, using 20% excess of the reagent, at a rate of 150 pound moles per hour. The separate streams of reactants entering the reaction zone were rapidly mixed together and $TiCl_4$ oxidized thereby forming titanium dioxide. The oxidation process proceeded over an extended period of time, e.g., 650 hours, without deterioration of the glazed, $TiO_2$ coated, nickel reaction zone wall and with only minor build-up of oxide scale appearing on the interior surface of the reaction zone wall, at most about ¼ inch. A high-grade pigmentary titanium dioxide product was obtained.

Example 2

Employing an apparatus of similar construction and dimensions to that described above in Example 1, a run was conducted using a stainless steel imperforated reaction zone wall indicated at 7 that has a coating of titanium dioxide 8 applied thereto. The reaction zone wall was enclosed in a cooling jacket 14 of an internal diameter of 14½ inches. The thickness of the reaction zone wall 7 was ¼ inch, prior to its coating with 1/64 inch of $TiO_2$ on the internal surface. The $TiO_2$ coating was applied to wall 7 with a spray gun using a solution of water containing 25% $TiO_2$ by weight. Before the coating was applied, the surface of the steel wall was prepared by pickling it in a hydrochloric acid solution to remove loose scale and to indicate imperfections and inclusions. The reaction ingredients were added at the same rate as shown in Example 1; however, prior to addition, the $TiCl_4$ was heated to 400° C. Oxygen was heated to 1425° C. and was added to the reactor in the form of a stream using a 10% excess, at a rate of 250 pound moles of $TiCl_4$ per hour. The oxygen stream contained water vapor equivalent to 5 pounds of water per 100 pounds of oxygen. The reaction zone wall was cooled to about 450–500° C. during the oxidation reaction. The oxidation reaction proceeded over an extended period of time, i.e., 4 weeks, without substantial deterioration of the stainless steel reaction zone wall and without contamination of the titanium dioxide pigment by metals from the reactor wall. Only a minor build-up, about ⅛ inch, of oxide scale appeared on the interior surface of the reaction zone wall.

From the above examples it can be seen that when a coating of titanium dioxide covers the metal surface of the reaction zone wall, prior to the oxidation flame reaction, it thereby provides a protective surface that prevents corrosion of the metal wall. In addition, it also provides a surface on which the titanium dioxide pigment will not readily adhere and form an undesirable oxide scale on the metal wall during the oxidation reaction, particularly when the temperature of the metal wall is cooled to about 500° C. or below.

There are several means available for coating the reaction zone wall with a protective coating of a white thermoreflective inorganic oxide. The coating, preferably titanium dioxide, can be applied by painting or brushing an aqueous slurry of titanium dioxide onto the surface of the reaction zone wall prior to its installation for use in the reactor or the wall can be cast and inserted therein. The coating composition can comprise either raw or pigmentary $TiO_2$ slurried in water and acid to provide an 80% by weight $TiO_2$ acidic suspension at a pH of about 4 to 4.5. The resulting thick paste can be employed to cast the wall into a nonshrinkable titanium dioxide reactor insert by pouring the slurry into a mold, and drying it in an oven above 100° C., followed by firing at about 1000–1300° C. to form the desired cast $TiO_2$ reactor wall insert. The thickness of this cast material can be varied from, for example, 0.25 up to 1½ inches with good results, and optimum results when the thickness of the layer is from 0.25 to 0.5 inch. Preferably, and alternatively, a slurry of titanium dioxide can be diluted to brushing consistency by further water addition and to form, for example, a 30% titanium dioxide slurry adapted to be applied over the internal surface of the metallic imperforated reaction zone wall to form thereon, when dry, a layer having a thickness of from about 0.01 to 0.1 inch.

Another suitable method for coating the reaction zone wall with titanium dioxide involves the decomposition of titanium tetrachloride vapor on the surface of said wall prior to the initiation of the oxidation flame reaction. This can be accomplished by passing titanium tetrachloride vapor and oxygen or air that may contain moisture through the reaction zone while maintaining the reaction zone wall at a temperature range of from 350° to 700° C. The reaction zone wall may be maintained at this temperature during the formation of the titanium dioxide coating by circulating a fluid through jacket 14. The titanium tetrachloride and oxygen-containing gas may be preheated, if desired, to 350° to 700° C. before they are fed into the reaction zone. However, the gases are fed into the reaction zone under low concentrations so that a flame is not generated. A glazed surface coating of titanium dioxide about 0.001 to 0.01 inch thick forms on the reaction zone wall. The surface temperature of the wall goes up, then down sharply indicating that a coating has taken place. The reactor wall does not require a recoating after each particular run since the titanium dioxide glazed surface does not flake off when the reaction is terminated. It has been found that this procedure used for coating the internal surface of the reaction zone wall by decomposing titanium tetrachloride on the surface thereof, although suitable, does not give the wall the equivalent lifetime that is realized when the surface is coated with a titanium dioxide slurry that is brushed on. It is much more difficult to control the application of the decomposition of titanium tetrachloride on the wall than it is to physically paint the reaction zone wall with the slurry of titanium dioxide prior to its installation.

Although the invention has been described above as applied to certain specific embodiments employing particular reactants, concentrations, temperatures, retention times, ratios, velocities and apparatus, the invention is not limited thereto. Variations may be made therefrom without departing from the underlying principles and the scope of the invention. Therefore, the outstanding usefulness of the invention resides in converting titanium tetrachloride by oxidation to titanium dioxide in order to obtain a high quality pigment. The invention is also applicable to the oxidation of other titanium halides or mixtures thereof, for example, the chlorides, bromides or iodides of that metal and those of the metals iron, zirconium, aluminum, antimony, tin, zinc and the like, which react in the vapor phase with a suitable oxygen-containing gas to produce a solid metal oxide.

As described above the preferred compound that covers the internal surface of the metallic imperforated reaction zone wall to form a thin glazed surface thereon is titanium dioxide. However, said reaction zone wall may be coated with other suitable compounds that are noncontaminating, noncolor-damaging, white thermoreflective inorganic oxides. A representative number of these compounds are, for example, $Al_2O_3$, $Nb_2O_5$, $Ta_2O_5$, MgO, $ZrO_2$, ZnO, $CaTiO_3$, $K_2O(TiO_2)_6$, all of which form suitable protective coatings that may be applied in the form of an aqueous slurry on the metal wall, or a precast insert, thereby preventing erosion and deterioration of the metal and also titanium dioxide wall scale build-up. The thickness of the white thermoreflective inorganic oxide coating on the wall is not critical, it has been found that most satisfactory results are produced when the oxide coating has an average thickness of from about 0.01 inch to 0.1 inch for coatings applied from aqueous slurries and about 0.25 to 0.5 inch for cast inserts.

The retention time of the reactants in the reaction zone can range from about 0.01 to 5 seconds generally, with a preferred time range being from about 0.1 to 1 second.

Humidified air comprises the preferred type of useful oxygen-containing gas, however other types and amounts of oxidizing gases containing free oxygen in a dry or humidified state can also be employed.

The reaction zone wall of this invention can comprise any useful high temperature corrosion-resistant rigid imperforated metal adapted to resist chlorine attack at temperatures below about 125° C. Although imperforated nickel comprises the preferred form of the reaction zone wall, said wall may be constructed of other suitable metal, for example iron, steel, aluminum, high nickel alloys, zirconium, titanium, thoriated nickel, and the like.

By following the process described in the present invention a high temperature oxidation reaction involving a titanium halide can be performed in a reaction zone fabricated from metal with substantially little corrosion of the metallic reaction zone wall and a negligible amount of oxide scale build-up on the reaction zone wall.

I claim:
1. A method for preventing corrosion and deterioration of a metallic imperforated reaction zone wall in which zone oxidation at an elevated temperature of titanium tetrachloride to produce a titanium oxide is effected which comprises coating the internal surface of the metallic imperforated reaction zone wall with a layer of titanium dioxide having an average thickness ranging from .01 inch to 0.1 inch in order to form a glazed surface thereon that prevents corrosion of the metallic surface and $TiO_2$ contamination and subsequently reacting titanium tetrachloride with oxygen in the vapor phase in the reaction zone while cooling the metallic reaction zone wall to a temperature below about 500° C. and recovering titanium dioxide.

2. The method according to claim 1 wherein the internal surface of the metallic reaction zone wall is nickel.

3. The method according to claim 1 wherein the coating of titanium dioxide is in the form of a cast insert.

4. A method for preventing $TiO_2$ contamination and corrosion and deterioration of a metallic imperforated reaction zone wall in which zone oxidation at an elevated temperature of titanium tetrachloride to produce titanium oxide is effected which comprises coating the internal surface of the metallic imperforated reaction zone wall with a layer of titanium dioxide by passing titanium tetrachloride vapor containing oxygen through the reaction zone in low concentrations so that a flame is not generated and maintaining the reaction zone wall at a temperature range of from 350° C. to 700° C. to form a glazed surface thereon having a thickness of about 0.001 to 0.01 inch and subsequently reacting titanium tetrachloride and oxygen in the vapor phase in the reaction zone while cooling the metallic reaction zone wall to about 450°–500° C. and recovering pigmentary titanium dioxide.

References Cited by the Examiner
UNITED STATES PATENTS

| | | | |
|---|---|---|---|
| 2,395,314 | 2/1946 | Blumer | 23—219 |
| 2,445,691 | 7/1948 | Pechukas | 23—202 |
| 2,670,272 | 2/1954 | Nutting | 23—202 |
| 3,073,712 | 1/1963 | Wigginton et al. | 23—202 |
| 3,203,763 | 8/1965 | Kruse | 23—202 |

References Cited by the Applicant
UNITED STATES PATENTS

| | | |
|---|---|---|
| 2,670,272 | 2/1954 | Nutting. |
| 2,915,367 | 12/1959 | Olson et al. |

OSCAR R. VERTIZ, *Primary Examiner.*

EDWARD STERN, *Examiner.*